Dec. 29, 1970
E. A. MATECKI
3,550,191
METHOD FOR MAKING SHIRRED CASING ARTICLES
Original Filed March 2, 1965
6 Sheets-Sheet 1
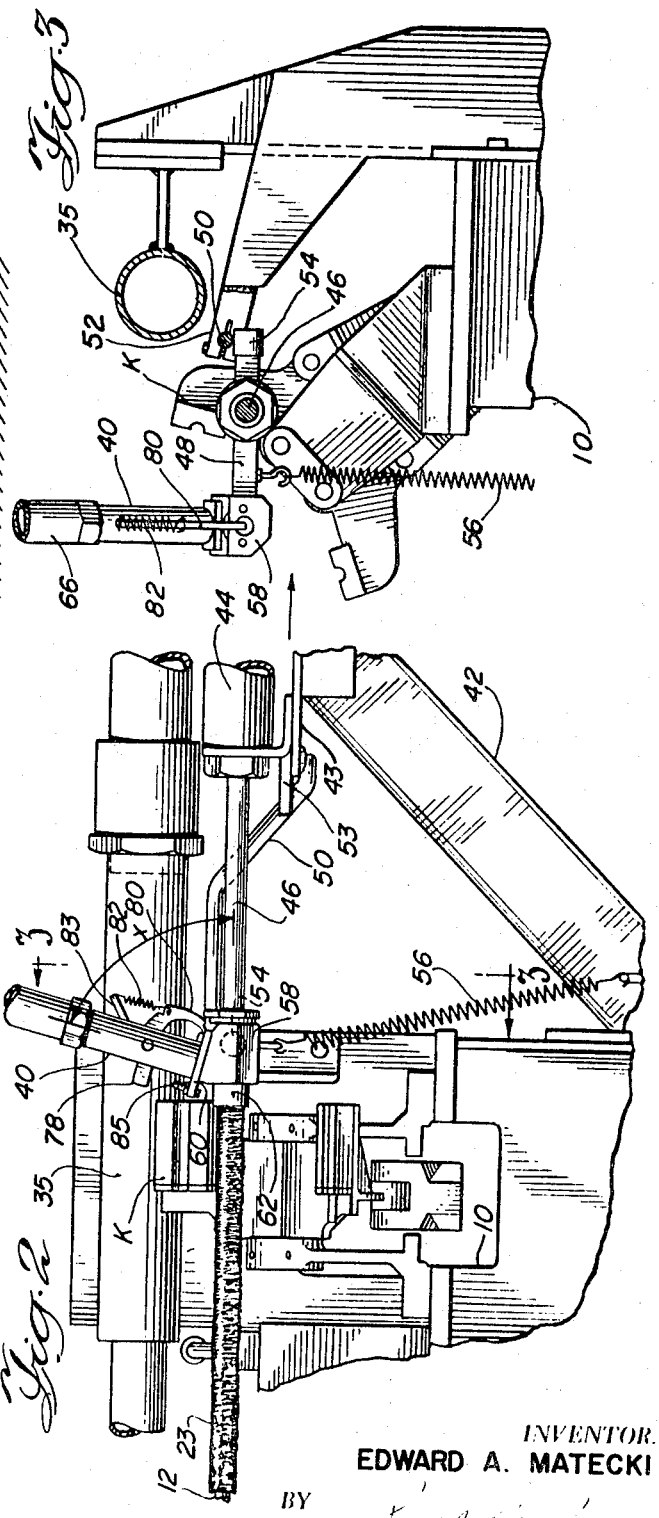
INVENTOR.
EDWARD A. MATECKI
BY
ATTORNEY

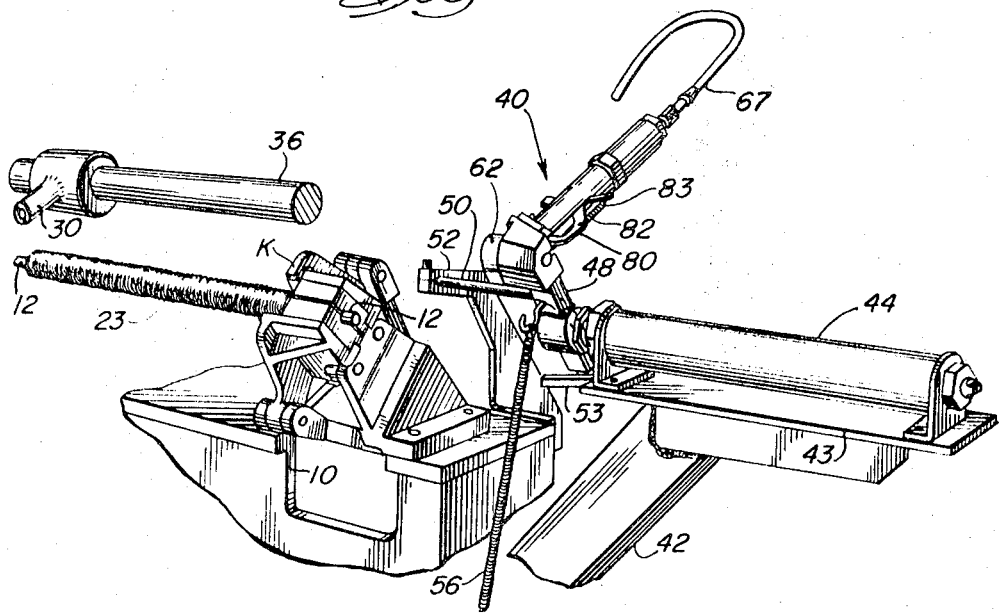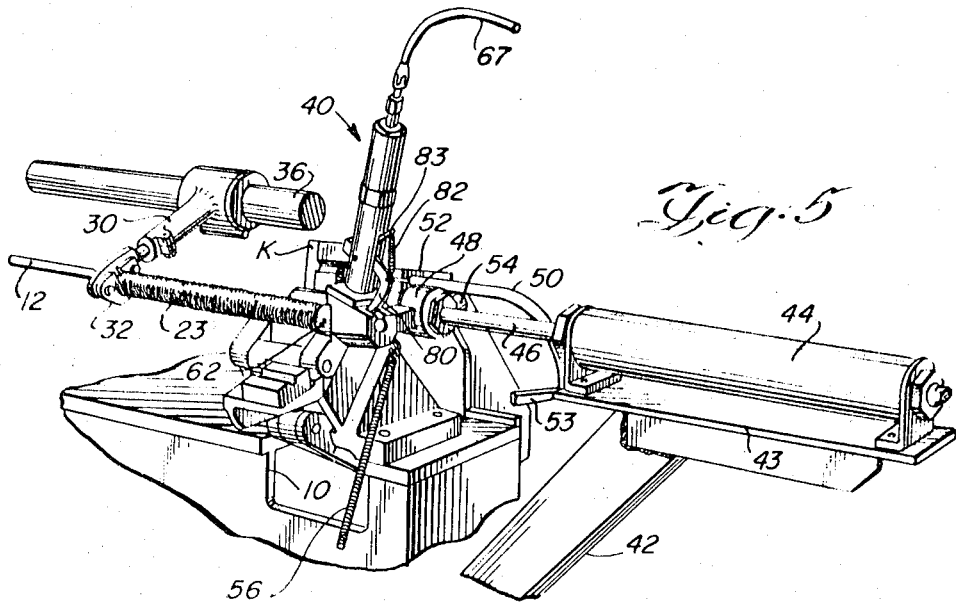

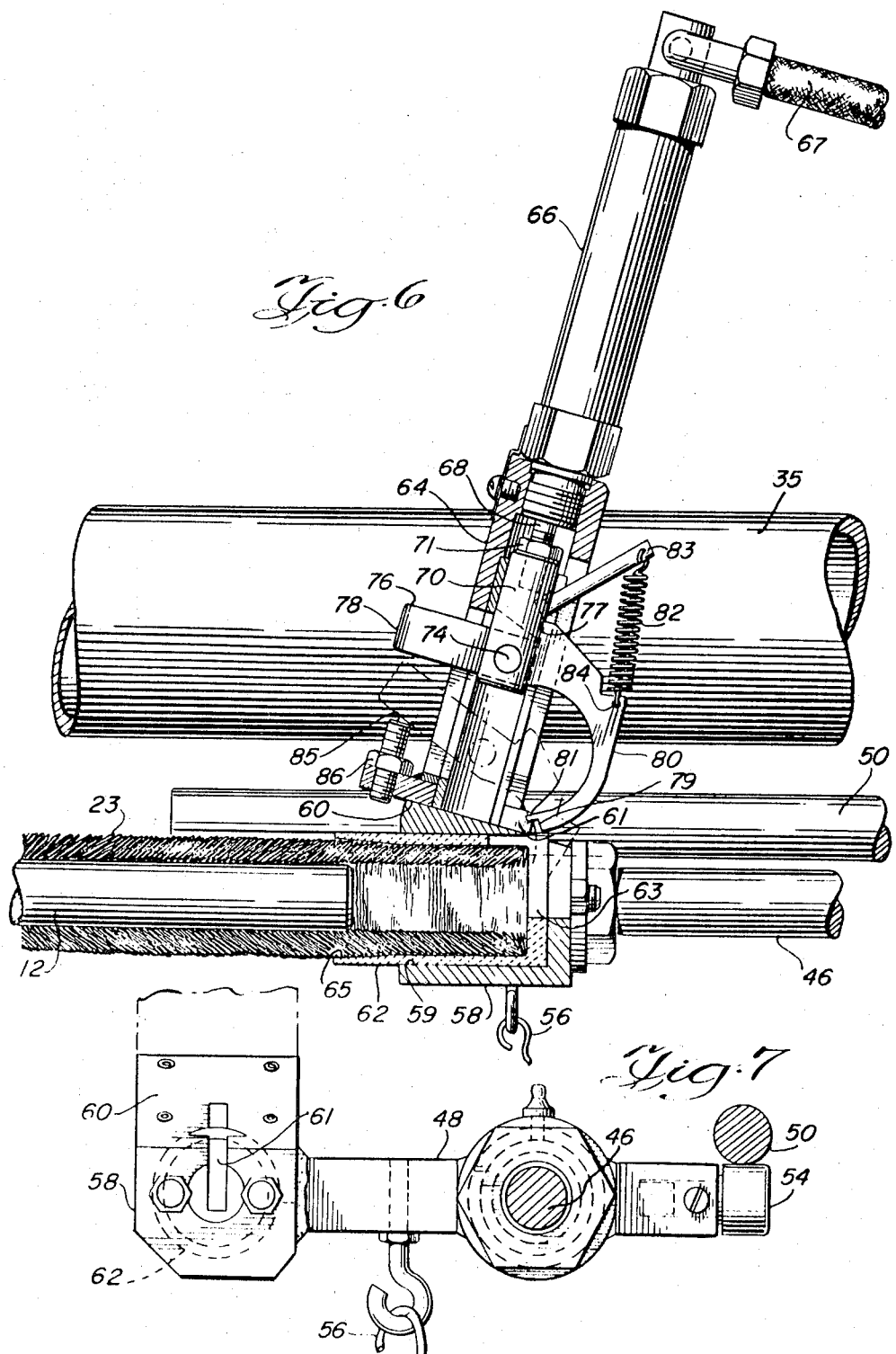

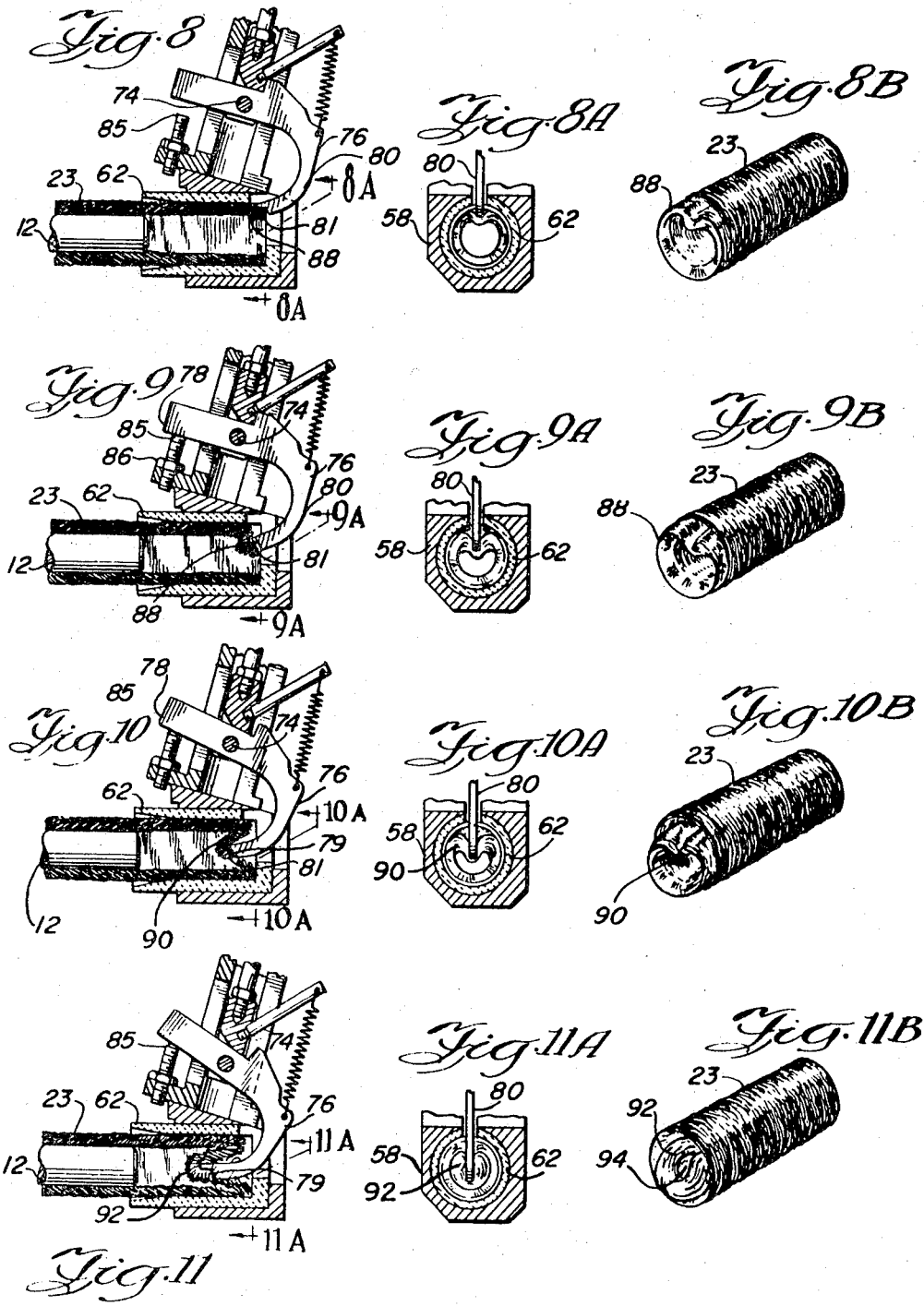

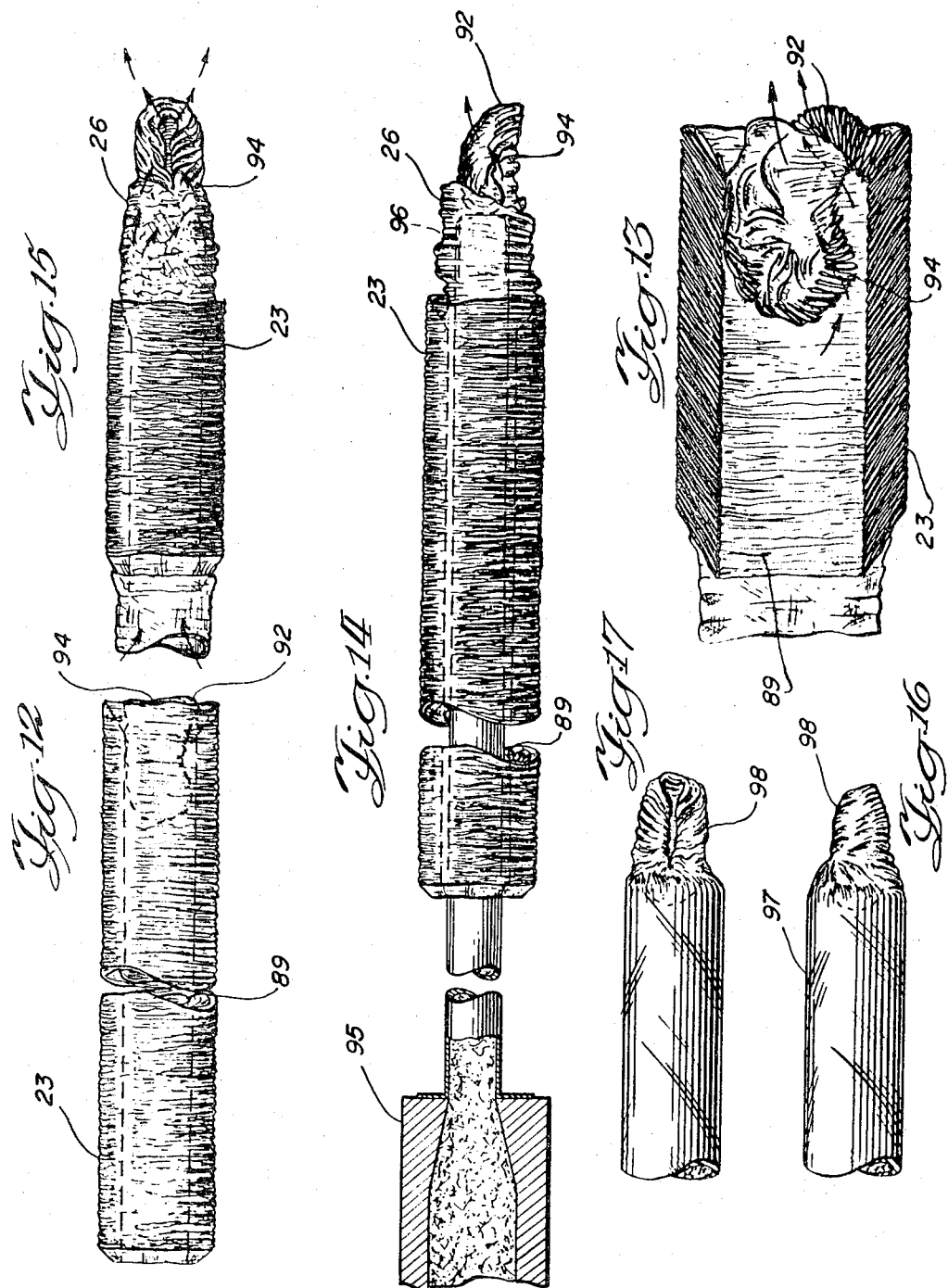

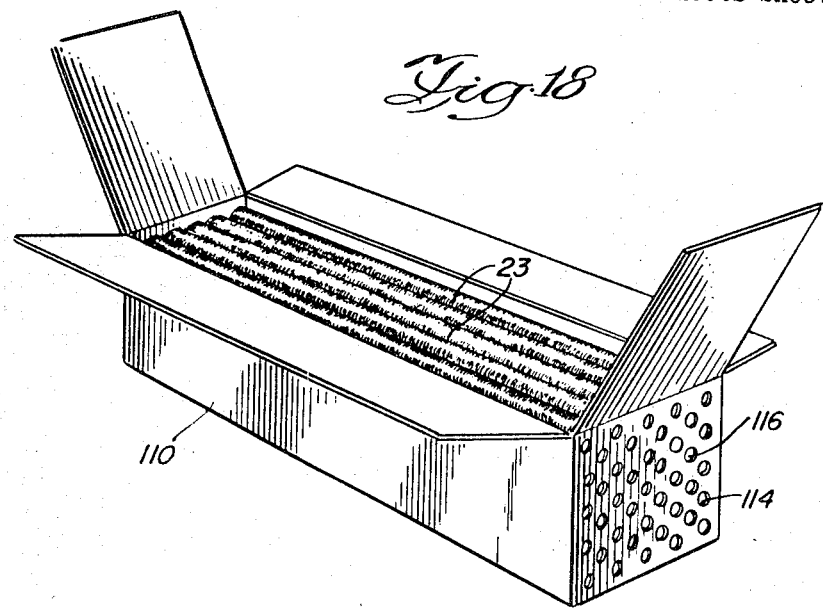
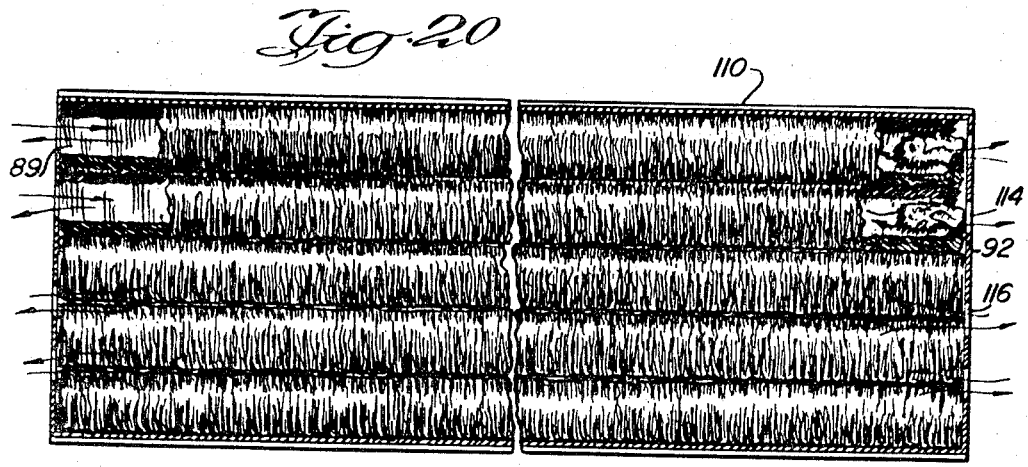
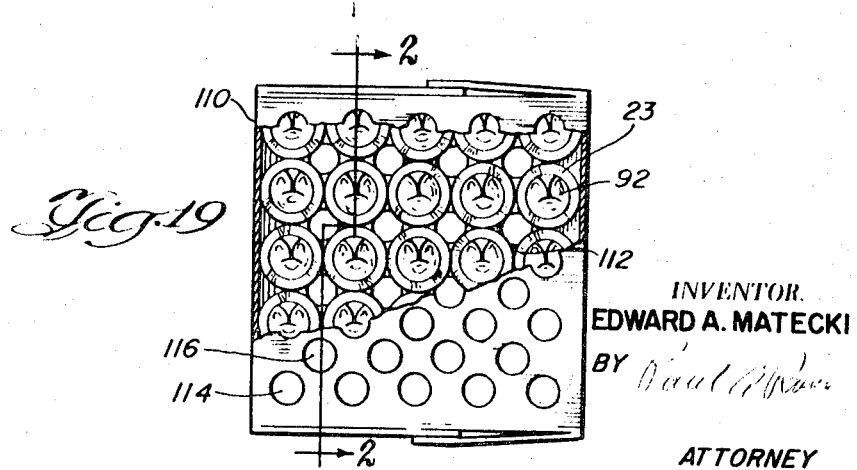
INVENTOR.
EDWARD A. MATECKI
ATTORNEY

United States Patent Office 3,550,191
Patented Dec. 29, 1970

3,550,191
METHOD FOR MAKING SHIRRED
CASING ARTICLES
Edward A. Matecki, Evergreen Park, Ill., assignor to Union Carbide Corporation, a corporation of New York
Original application Mar. 2, 1965, Ser. No. 436,584, now Patent No. 3,419,401, dated Dec. 31, 1968. Divided and this application Sept. 3, 1968, Ser. No. 810,043
Int. Cl. A22c 13/00
U.S. Cl. 17—49         10 Claims

ABSTRACT OF THE DISCLOSURE

A hollow shirred meat casing stick having a closure at one end of the casing stick's bore is prepared by a procedure wherein one end of the casing stick is crimped and the crimped casing is inturned about itself and implated in the bore of the stick. The closure is pervious to the passage of a gas while maintaining its integrity to block the flow of meat emulsion during filling of the casing stick.

This application is a division of application Ser. No. 436,584, filed Mar. 2, 1965, now U.S. Pat. No. 3,419,401, issued Dec. 31, 1968.

This invention relates to a novel meat casing article, and to the method and apparatus for making such article, as well as to a package of such novel articles. More particularly, it relates to a shirred meat casing of flexible tubing having a closure at one end thereof, said closure blocking or obstructing the passage of meat emulsion therethrough when the casing is stuffed or filled to make sausages such as frankfurters, pork sausages and the like. The closure in the shirred meat casing comprises a plug of casing material implanted at one end of the casing's bore and predetermines the direction in which the casing is stuffed.

Flexible tubing used for meat casings may be comprised of proteins, carbohydrates, and the like such as collagens, alginates, starches or cellulosic materials such as cellulose esters, cellulose ethers and regenerated cellulose, as well as other natural, synthetic or artifical materials.

Regenerated cellulose casings are used extensively in the manufacture of skinless frankfurters and this invention will be described with particular refernce thereto. In practice, cellulosic tubing of an appropriate length such as for example 55 feet, 84 feet, or 110 feet or more is shirred at a moisture content of from about 7 to 12 percent and is then compressed to produce what is commonly termed in the art, shirred casing sticks of from about 9 inches to 20 inches in length.

These shirred casing sticks are packed in small boxes having perforated end walls and are known in the art as caddies. For 84 feet of casing lengths the caddies are about 15 inches long, and depending on casing diameter may range in width from about 7½ inches to 11 inches, and in height from 3½ inches to 5 inches. The casing sticks are then humidified to a moisture content of up to about 20 percent by passing moist air through the perforated end walls of the caddy and through the bores of the casings, as well as around and about their exteriors while they are packed in the caddy.

For optimum stuffing performance, it is desirable to suply the frankfurter producer with shirred compressed casings having a moisture content greater than about 12 percent and less than about 20 percent and preferably of about 14 to 16 percent moisture content, the percentage being based on the weight of the water content, divided by the combined weight of water, tubing and plasticizer. In one embodiment, the tubular casings can be shirred at a moisture content between about 12 percent and 20 percent whereby the casing after being provided with the end closure can, if desired, be packaged without providing additional humidification to change the moisture content. By packaging such casings in moisture-proof packages, the moisture content of the casings will remain substantially constant during shipment and storage, and will be at the optimum moisture content for stuffing.

In another embodiment, the casings which are more readily shirred at a moisture content of less than about 12 percent, can be shirred at a moisture content of from 7 to 12 percent and after being provided with the end closure, can if desired, be packaged in the caddy with wetted sheets of bibulous paper to change the moisture content of the casings to the preferred range of 14 to 16 percent for optimum stuffing.

Such casing sticks may be stuffed with meat emulsion by manual or automatic operations. In a manual operation, the casing stick is sheathed onto a thin-walled meat stuffing horn connected to a valved vessel filled with meat emulsion under pressure. The operator may deshirr a short length of casing at its outboard end to prevent the loss of meat emulsion and to tie one casing length to another for a subsequent linking operation. The operator controls with one hand the filling and deshirring of the casing and concurrently with the other hand controls the valve and thereby the meat pressure in the stuffing horn to fill the tubing to its proper stuffed diameter.

More efficient frankfurter processing operations are desired to offset increasing labor costs and, accordingly, they demand speedier production techniques in each phase of the process. Automated devices have been developed for successively stuffing and linking a plurality of shirred casing sticks.

In an automatic stuffing procedure for making frankfurters, a plurality of shirred casing sticks may be placed in a dispensing hopper of an automatic stuffing-linking apparatus. The machine successively dispenses one stick at a time from the hopper to clamping-aligning means that align the stick's bore with a thin-walled reciprocating meat stuffing horn. The stuffing horn is retractable to a starting position aft of the casing stick positioned in the aligning means. The discharge end of the stuffing horn is advanced into the casing bore and must engage the fore end of the casing stick to initially deshirr and push the fore end about midway through the annular passage of a control chuck. Then a pusher at the aft end of the stick advances to compress the casing and seat the fore end of the casing wall into flutes of the chuck's passage. Before the stuffing-linking operation begins, the casing's fore end is firmly seated into and gripped by flutes of the chuck. Meat emulsion is dispensed from the stuffing horn and the chuck is rotated to control the filling of the casing and to cooperate with linking means to thereby form the filled casing strand into links of predetermined length so that the strand may be processed as is well known in the art, to produce skinless frankfurters.

Stuffing-linking devices that operate in such a manner require that the fore end of the casing have a plug or closure so that the advancing stuffing horn may engage to advance the casing into the chuck to thereby deshirr the casing without dissociation of the closure and also to effectively block the flow therethrough of meat emulsion. The closure thus serves as an abutment to properly initiate suitable filling and deshirring of the casing stick and provides suitable control for the start of the linking operation.

Heretofore the shirred casing sticks were supplied completely shirred, leaving a hollow opening or bore therethrough of such a diameter that the stick might be readily slipped over a stuffing horn.

The sticks were tightly packed in the caddies in layers in such a way that the direction of shirring was the same for all of the sticks in a given caddy and the preferred direction for stuffing was marked on the top of the caddy. However, once the box was opened by the meat packer and this marking was destroyed or the contents jostled about, the direction of shirring could be determined only by close inspection of each stick. Also in manual stuffing, each stick was preferably deshirred a short distance for reasons stated above as it was placed on the horn. Therefore, a closure that is implanted or anchored in the casing stick at a pre-determined end of its bore serves to designate the preferred stuffing direction for manual and for automatic stuffing even though the casing stick is removed from the marked caddy.

When completely hollow casing sticks were used with automatic stuffing-linking devices, the meat packer had to plug one end of each casing by tying, twisting or inserting an obstruction to meat flow. This was a costly and time consuming operation for the meat packer.

The plugging of the casing bore can be done more economically at the casing manufacturing plant immediately after shirring, by deshirring a tab and folding it back on the shirred stick or by infolding casing material in the bore, or by inserting a closure of another material. However, as heretofore described, casings are optimumly shirred at low moisture contents and after shirring are humidified for optimum stuffing performance by passing moist air through the bores of the casings, as well as around and about their exteriors while they are constrained in the shipping caddy. Thus, in one embodiment the closure may be implanted and anchored in the fore end of the casing stick in a manner whereby it is pervious to a gas, which gas may be passed in either direction through the bore of the casing for adjusting the moisture content or other conditioning agent of the casing material to a predetermined level and which also in the meat stuffing operation will effectively block the passage of meat emulsion out of the casing's fore end.

The closure or plug is preferably made of a predetermined length of the parent casing material and integral therewith rather than the insertion of a separate and/or foreign material. Thus the use of integral parent casing material to form the plug eliminates the possibility of contamination in the finished frankfurter product and allows the easy separation therefrom. The plug or closure of predetermined length of casing is desirably readily dissociated to permit the easy tying together without waste of the fore end and aft end of a previously stuffed and linked casing strand to the intermediate portion of the linked strand. This secures the initial and terminal links to the parent strand and prevents untwisting of the neighboring links in the smoking and cooking operations.

In one embodiment, the material of the closure is disunited from the body of the casing stick, and is in turned, compressed and implanted or anchored within the casing's bore. Such a closure is adapted to maintain its integrity during the stuffing operation and to permit the clean stripping of unwanted meat emulsion from the casing by manually dissociating the folds of the closure without extensive manipulating or cutting away the casing comprising the closure, to thereby provide the tying means.

The principal object of this invention is to provide an improved hollow shirred meat casing stick having a closure in one end of the stick which blocks flow of meat emulsion therethrough.

Another object of this invention is to provide a shirred meat casing stick having a closure anchored in the casing to prevent improper sheathing of the stick onto a stuffing horn and to permit internal engagement of the closure with means to deshirr and stuff the casing with meat emulsion, Another object of this invention is to provide a method for making a closure in a shirred casing stick integral with the casing stick and which is pervious to a gas and blocks the flow of meat emulsion therethrough.

Another object of this invention is to provide a method for post conditioning a plurality of casing sticks packed in a caddy, the casing sticks having a closure anchored in one end of the stick's bore.

Still another object of the invention is to provide a method of making a closure in the bore of a shirred cellulosic casing stick by cradling one end of the stick, indenting a portion of the stick's rim, crimping and infolding the indented rim and implanting it into the bore at one end of the casing stick.

Other and additional objects of the invention will become apparent from the specification, description and accompanying drawings.

According to one embodiment of this invention there is provided an elongate shirred and compressed stick of cellulosic casing having a closure or plug in one end of its bore suitable for use in automatic stuffing-linking machines. The shirred casing is substantially circular in cross section and has a substantially straight internal bore from its first end to its second end. A plug of indented and shaped casing is disunited from one end of the shirred stick and is implanted or anchored into the casing stick's bore, forming the plug into a bilaterally symmetrical closure that is pervious to gas and also provides a sufficiently rigid abutment means integral with the parent casing to maintain integrity of the closure for deshirring the fore end of the casing stick by internal force means and also permits dissociating the folded casing comprising the closure for stripping meat emulsion from the filled casing.

In one embodiment of making such a casing, cellulosic tubing is shirred by pleating on a mandrel by one of several passage forming shirring methods well known in the art. The shirring is accomplished by continuously moving the inflated casing by metering rolls from a supply of continuous flattened tubing over a mandrel of smaller diameter than the inflated casing to and through a shirring passage of smaller diameter than the inflated casing, the passage being formed by a plurality of shirring rolls where a predetermined length of the casing is shirred and compacted against holdback means as a first step.

When the predetermined length of casing has been shirred and compacted, it is severed from the following shirred casing and is advanced to a mandrel clamp as a second step. Additional compaction is imparted to the severed length by axially compressing the casing length on the mandrel against the mandrel clamp as a third step.

The mandrel clamp is opened and the compressed casing length is advanced by axially compressing it into the cradling cup of a crimping device as a fourth step. A former blade of the crimping device is led through a narrow passage in the cup to indent and infold the fore end pleats of the casing and then crimp, implant and anchor the fore end of the stick into the bore as a fifth step.

In a sixth step the casing is released from axial compression, the former blade is retracted, the cradling cup is removed from the casing, and the finished plugged casing length is doffed from the mandrel.

The terms "fore end" and "aft end" of the shirred casing stick are used hereinafter to indicate the direction of shirring in the stick, the fore end being the first part of the casing to be shirred, and the aft end being the last to be shirred. In a conventional shirring apparatus such as that referred to above, flattened tubular casing is advanced onto the shirring machine mandrel in an inflated condition. The end of the casing first fed onto the mandrel is the fore end. As the length of casing is fed through the shirring apparatus, a shirred stick is formed. The folding and pleating of the casing during the shirring operation provides a stick which is preferably deshirred and filled with meat emulsion in a predetermined direction.

In the embodiment shown in the figures, the crimping-anchoring device is arranged on the machine frame adjacent the doffing end of the mandrel. The crimping device has a hollow cylindrical cup for cradling the fore end of the shirred casing stick during the crimping, implanting and anchoring operation. The crimping device is mounted on a crosshead that advances and retracts and concurrently moves the cup into and out of alignment with the mandrel. In its advanced position the cup is axially aligned with the center of the mandrel and the lip portion of the cup encompasses the doffing end of the mandrel. The side and bottom wall of the cradling cup has a passage to pass therethrough a thin elongate crimping blade from the outside to the inside of the cup.

The crimping blade in its inoperative position is retracted from the interior of the cradling cup. After the step of compressing of the shirred casing on the mandrel has been completed, the casing stick is advanced along the mandrel into the cup and is axially compressed against the cup's bottom wall. A hooked end of the crimping blade is advanced obliquely downwardly by a pneumatic cylinder to engage and separate by indenting, a portion of the rim of the end from the remainder of the cradled compressed casing. By means later described, the crimping blade continues to advance and to collapse and infold the indented portion about the sides of the blade and then implants and anchors the infolded rim portion as a plug of casing into the bore of the cradled casing stick.

Adjustment means are provided to regulate the relative operative positions of the casing's fore end and the stroke and terminal position of the crimping blade. Thus regulated, the positions of the casing and of the indenting and infolding means yield a plug closure of predetermined length of compressed casing that is shaped by the bore as it is concurrently implanted therein by the crimping blade and anchored to the wall of the casing bore. After the crimping blade is withdrawn from the plug, the space the blade occupied in forming the closure provides a narrow bilateral passage through the infolded casing material of the plug. The passage comprises a substantially bilateral labyrinth formed about each side of the nose of the infolded implanted plug of casing and connects the bore with the exterior of the casing stick. The passage thus formed through the closure implanted in the casing bore, has been found to be pervious to gas and may be used for the post conditioning of the casing material after packing in a caddy. This closure has been found to block the passage of meat emulsion filling the casing under pressures common to hand stuffing, and to automatic stuffing-linking machine operations. This closure has been found to maintain its integrity as a closure during the stuffing operation and yet may be made to dissociate by manually stripping meat emulsion along the casing thereby forcing the interlocked folds of the casing closure to open and pass the meat emulsion therethrough. The plug in the casing made by the method of this invention is readily and uniformly produced on means in line with the equipment used to shirr casing or the plug of casing may be implanted in the casing in a separate operation remote from the shirring machine.

Illustrative embodiments of the invention are shown in the drawings wherein:

FIG. 1 is a diagrammatic side elevation of a shirring apparatus, showing the preferred embodiment of the plug forming means in its retracted or inoperative position;

FIG. 2 is an enlarged side elevation of the casing crimping means in its advanced position adjacent the second mandrel clamp of a shirring apparatus shown in FIG. 1;

FIG. 3 is a section taken along line 3—3 of FIG. 2;

FIG. 4 is a perspective view of the casing crimping device of this invention shown in its retracted or inoperative position with relation to a shirred casing on the mandrel;

FIG. 5 is a perspective view of the casing crimping device in its advanced or operative position for crimping a shirred casing on the mandrel;

FIG. 6 is a further enlarged side elevation partly in cross section of the casing crimping means of FIG. 2 and showing in phantom, part of the crimping blade in fully extended position;

FIG. 7 is an end elevation of the cross head mounting of the casing crimping unit of FIG. 6;

FIG. 8 is a cross section of the lower portion of the casing crimping means of FIG. 6, showing the piston extended about 30% of its stroke;

FIG. 8A is a section taken along line 8A—8A of FIG. 8;

FIG. 8B is a perspective view showing the indented casing end of FIG. 8A;

FIG. 9 is a cross section of the lower portion of the casing crimping means of FIG. 6, showing the piston extended about 65% of its stroke;

FIG. 9A is a section taken along line 9A—9A of FIG. 9;

FIG. 9B is a perspective view showing the further indented casing end of FIG. 9A;

FIG. 10 is a cross section of the lower portion of the casing crimping means of FIG. 6, showing the piston extended about 85% of its stroke and the crimping blade rotated about 10° about the fulcrum pin;

FIG. 10A is a section taken along line 10A—10A of FIG. 10;

FIG. 10B is a perspective view showing the indented casing partly crimped to the floor of the bore of FIG. 10A;

FIG. 11 is a cross section of the lower portion of the casing crimping means of FIG. 6 showing the piston fully extended to the limit of its stroke and the crimping blade rotated about the fulcrum pin about 20°;

FIG. 11A is a section taken along line 11A—11A of FIG. 11;

FIG. 11B is a perspective view showing the indented crimped casing implanted into the bore of the casing stick;

FIG. 12 is a side elevation of a casing stick of the invention with its center portion broken away;

FIG. 13 is an enlarged cross sectional view of the plug implanted in the end of a portion of the casing of FIG. 12;

FIG. 14 is a side elevation of a portion of a casing stick of the invention partly deshirred by an advancing stuffing horn abutting the casing closure;

FIG. 15 is a plan view of the casing closure and of FIG. 14;

FIG. 16 is a side elevation of a portion of a casing stick of the invention fully stuffed with meat emulsion;

FIG. 17 is a plan view of FIG. 16;

FIG. 18 is a perspective view of the casing sticks packaged in a shipping caddy with the package top flaps opened;

FIG. 19 is an end elevation of the caddy with its flaps closed and with a portion of the caddy end broken away to show the casings closure ends;

FIG. 20 is a section taken along line 2—2 of FIG. 19.

As may be seen from FIG. 1, in the operation of the shirring machine a supply of flattened tubing such as cellulosic tubing 18 is expanded as by gaseous means and advanced through a pair of vertical guide rolls 25 to metering rolls 16 and the metered inflated tubing 20 is aligned centrally by two pairs of annularly grooved rolls 19 arranged in tandem, which guide the tubing onto hollow mandrel 12 and through shirring head S.

The desired length of inflated casing 20 is loosely shirred by any of a number of suitable shirring heads S mounted on machine frame 10. The methods and apparatus for shirring the casings to form these sticks are many. Exemplary methods and apparatus for so shirring a tubular cellulose casing are described in U.S. Pat. 2,819,488 to Gimbel and 2,984,574, 2,983,949 and 3,097,393 to Matecki.

The leading end of the floating hollow mandrel 12 is positioned between the shirring head S and the nip of the metering rolls 16. Gaseous inflating means is supplied to the casing 20 through the leading end of mandrel 12 which is supported in stationary position by clamps C and K. The inflating air is supplied to the mandrel 12 through first clamp C connected to a compressed air supply hose 38.

The loosely shirred casing 22 is restrained and compacted in its advance from the shirring head S by a retracting holdback 24. When a predetermined length of casing such as for example about 84 feet, is shirred on the mandrel, the compacted shirred casing length 22 is severed from the following shirred casing at a position adjacent the shirring passage S, clamp C is opened and the severed casing length is advanced along mandrel 12 until its fore end abuts closed clamp K (casing shown as 23). Compressor arm 30 is rotatably secured on piston rod 36. A pair of mandrel encircling jaws 32 are mounted on the outboard end of compressor arm 30 to engage mandrel 12 aft of the severed casing.

Independently actuated pneumatic cylinders 34 and 35 are mounted on frame 10 in tandem on a common axis. When jaws 32 engage mandrel 12 aft of the severed shirred casing 23, cylinder 34 is actuated thereby advancing piston rod 36 and compressor arm 30 toward the right, and compressing casing 23 against clamp K. The stroke of piston rod 36 is arrested at a predetermined position by abutment with the end of advanced piston rod (not shown) of cylinder 35. Cylinder 35 is actuated at a higher pressure force than cylinder 34 to arrest piston rod 36 at the predetermined position, and thereby initially controls the advance of compressor arm 30 to yield the desired compressed length such as about 14 inches of casing 23. At termination of the compression cycle, clamp K is opened and the air in cylinder 35 is released, retracting its piston rod, while cylinder 34 remains pressurized thereby advancing piston rod 36 and compressor arm 30 along mandrel 12 to advance the fore end of casing 23 into the cup of the crimping device shown generally as 40 in FIGS. 4 and 5 and later described in detail. Concurrently as clamp K is opened the crimping device 40 is advanced to its operative position for crimping a shirred casing on the mandrel as later described.

After the fore end of casing 23 is plugged by implanting a closure of infolded casing in the casing's bore, the compressor arm 30 is retracted left from the aft end of casing 23 and concurrently the crimping device 40 is retracted right from the fore end of casing 23. The compressed plugged casing length 23 is then doffed from the end of mandrel 12.

Meantime the next shirring cycle provides a next successive length of compacted casing 22 and the operation of severing, transferring, compressing, plugging and doffing of the stick of casing is repeated.

Refer now to FIGS. 2 and 3. The crimping device 40 is fastened to machine frame 10 by bracket 42 and mounting plate 43. Double acting pneumatic cylinder 44 is fastened to plate 43 to operate parallel to mandrel 12. The outboard end of piston rod 46 of cylinder 44 is rotatably fastened to the mid portion of crosshead 48, which in turn mounts the crimping device 40.

A stationary slide cam 50 is fastened to machine frame 10 at one end by bracket 52 and at its other end to bracket 42. V-guide 53 is fastened to frame 10 and is adapted to secure the crosshead 48 in its elevated, retracted position as shown in FIG. 4. Slide cam 50 is shaped in a helix to cooperate with cam follower 54 which is rotatably fastened to the inboard end of crosshead 48 (see FIGS. 5 and 7). Piston rod 46 is caused to advance and retract crosshead 48 at desired time intervals of the machine cycle by appropriate pressurizing of cylinder 44. The axial movement of rod 46 causes cam follower 54 to follow the helix comprising cam 50 concurrently rotating crosshead 48 and thus raising and lowering crimping device 40 into and out of axial alignment with mandrel 12. Tension spring 56 is fastened at its lower end to machine frame 10 and at its upper end to the outboard arm of crosshead 48 and is tensioned to urge the cam follower 54 against cam 50 during movement of crosshead 48.

Refer now to FIG. 6. The outboard end of crosshead 48 comprises mounting block 58 that has a shouldered bore 59 parallel to the axis of piston rod 46. A slotted passage 61 is provided in the shouldered end of block 58. Crimper cup 62 is provided with slotted passage 63 in its side and end wall and has an internally tapered lip 65 to pilot the entry of casing 23. Cup 62 is frictionally secured in bore 59 with passage 63 of block 58 and passage 61 aligned with each other. Block 58 is provided with an oblique top mounting surface 60 for fastening sleeve 64 thereto. The outboard end of sleeve 64 is provided with an internal thread to secure the rod end of pneumatic cylinder 66 thereto. Cylinder 66 is a single acting spring return air cylinder that is actuated by compressed air from supply hose 67.

Crimper piston rod 68 is threadably aligned with and fastened to crimper clevis 70 and is adjustably secured thereto by locknut 71. Clevis 70 is provided with fulcrum pin 74 to rotatably mount crimper blade 76. Crimper blade 76 has an inboard end 78, an outboard end hook 80 and a shoulder 77 adjacent the fulcrum pin 74. Shoulder 77 is adapted to abut against the side wall of clevis 70 and is urged thereto by tension spring 82 biased between hook pin 83 and fastening hole 84 in blade 76. Pin 83 is secured to clevis 70. In the inoperative position of the crimping device, blade 76 is held at right angles to the cylinder 66 axis.

In the embodiment shown, the angle X (FIG. 2), between crimper cylinder 66 and mandrel 12 is about 70°. Other embodiments using an angle X of from about 60° to 80° have been found satisfactory when used with an appropriately modified crimper blade 76.

FIGS. 8 and 8A show the relationship of casing 23, mandrel 12 and cup 62 to tip 81 of crimping blade 76 when the piston 68 has been advanced to about 30% of its travel. When cylinder 66 is pressurized, crimper blade 76 is initially advanced obliquely downwardly by clevis 70 and the blade's hook 80 is advanced through passage 61 in mounting block 60 and also through cup passage 63 to engage, disunite a segment 88 of casing from the stick's end and indent the segment's upper rim. Casing 23 is subjected to axial pressure by compressor arm 30 to abut the casing's fore end against the bottom of cup 62. The blade's hook 80 is provided with tip 81 and shoulder 79 proportioned to engage the rim surface of the casing stick's fore end and initially disunite from stick 23 a predetermined length segment 88 such as about 1/8 inch. Segment 88 is subsequently collapsed by tip 81, infolded and implanted by shoulder 79 as a plug 92 compacted into the casing's bore 89.

FIGS. 9 and 9A show the relationship of casing 23, mandrel 12 and cup 62 to tip 81 of crimping blade 76 when the piston 68 has been advanced to about 65% of its travel. From the relationship of components shown in FIG. 8, the movement of tip 81 and shoulder 79 is continued parallel to the movement of clevis 70 to further obliquely indent and collapse the rim of casing segment 88. In FIG. 9 the bottom surface of the blade's inboard end 78 is shown abutting threaded stop pin 85. Stop pin 85 is adjustably positioned by lock nut 86.

FIGS. 10 and 10A show the relationship of casing 23, mandrel 12, and cup 62 to tip 81 of crimping blade 76 when the piston 68 has been advanced to about 85% of its travel and blade 76 has been rotated approximately 10° about fulcrum 74. As the advance movement of clevis 70 is continued from the position shown in FIG. 9, stop pin 85 arrests the advance of inboard blade end 78 to rotate tip 81 and shoulder 79 of the crimping blade about fulcrum pin 74, and shoulder 79 thereby starts to infold the collapsed casing segment about the sides of hook 80 into heart shaped form 90.

FIGS. 11 and 11A show the relationship of casing 23, mandrel 12 and cup 62 to tip 81 of the casing crimping means when the piston 68 has been fully extended to the limit of piston travel and blade 76 has been rotated approximately 20° about fulcrum 74. As clevis 70 is finally advanced to the limit of its travel from the position shown in FIG. 10, crimping blade 76 is further rotated about fulcrum pin 74 and shoulder 79 continues the infolding of heart shaped casing 90 about the sides of hook 80 to form plug 92 and shoulder 79 axially advances further to implant and anchor the plug 92 into the casing's bore 89.

FIGS. 8B, 9B, 10B and 11B show in perspective a typical step-by-step progressive formation of the casing closure from the separating and initial indenting of segment 88, to the collapsing and infolding (shape 90) and thence to the final forming and implanting of plug 92 into the stick's bore. The effect of the initial oblique motion and final combination of oblique and rotative motion of the blade's tip 81 and shoulder 79 on the casing stick's fore end is illustrated in FIGS. 8B, 9B, 10B and 11B in relation to the blade positions shown in FIGS. 8, 9, 10 and 11.

The invention may be employed in the shirring of casings of varying diameters and wall thicknesses. It is particularly useful in connection with casings ranging in diameter from 9/16 inch to 1¼ inches and having wall thicknesses of from about .0006 or less to .003 inch or more.

Refer now to FIGS. 12 and 13. In a typical operation, 84 foot lengths of 0.84 inch inflated diameter cellulosic casing were shirred on a 0.620 inch diameter mandrel and compressed to a length of about 14 inches. After compression the casing stick 23 had a bore 89 with an internal diameter of .565 inch and an external diameter of about 31/32 inch. A plug 92 of shirred casing material, which in its unshirred condition is about from 9 to 12 inches in length, was implanted into the casing bore by the apparatus of the invention.

The fore end of the casing stick was advanced into a cup 62 having an internal diameter of 1.035 inch and a depth of about 2 inches and a slot passage 63 of 3/16 inch width. The casing was recompressed to a length of about 14 inches, seating the fore end of the casing into the bottom of the cup 62. A crimping blade 80 having a hook of .112 inch thickness, tip 81 of 5/32 inch length and shoulder 79 of 11/64 inch length having a radius of 1¾ inches from fulcrum pin 74 was arranged to have tip 81 initially engage the casing rim and shoulder 79 to have a slight clearance from the fore end wall. Tip 81 and shoulder 79 were then advanced about ⅜ inch obliquely into the end wall of the casing at an angle of about 70° to indent a segment 88 of about ⅛ inch length of shirred casing. As tip 81 was advanced about an additional ¼ inch it was concurrently rotated about fulcrum 74 to collapse and infold segment 88 into a plug 92 of about 9/16 inch diameter and about ¾ inch length. The bore 89 of highly compressed pleats comprising the shirred casing served as a hollow die to mold plug 92 to the conformation of the bore surface concurrently as plug 92 was implanted therein and thus firmly anchored the plug into the bore 89.

The preferred closure of the invention has a combination of features that function in a different manner at various steps of the stick's utilization as a sausage casing. First, the closure in the casing stick must have a passage pervious to a gas which may be flowed through the bore in either direction for post conditioning the casing material after packing in a caddy. Second, the closure must maintain its integrity as a closure during the manipulative steps common to hand stuffing or automatic stuffing with meat emulsion. Third, after stuffing the casing, it should be possible to dissociate the closure by stripping meat emulsion therethrough.

The passage for flowing conditioning gas through the closure is provided by a bilateral labyrinthine passage formed about each side of the nose portion of plug 92 centrally positioned in bore 89 and thence through the central void left in the plug when blade hook 80 is subsequently withdrawn.

It was found that the length of shoulder 79 was critical to optimum formation and final placement of plug 92 in bore 89 to provide the gas passage. A shoulder of sufficient length is necessary to infold the entire bulk of disunited casing segment 88 into the desired nose shape and space the nose of plug 92 from the bore wall to form the labyrinthine passage without the infolded segment slipping from the blade shoulder.

In the fully advanced position of hook 80 the outboard edge of shoulder 79 must also be spaced from the inner surface of bore 89 in order to vent casing inflation air through the space. Casing inflation air is normally being vented from mandrel 12 during the shirring of a successive piece of casing 22. Unless this mandrel air is vented, internal pressure is imposed on the stick which upon withdrawal of the blade hook 80 from the implanted closure 92 and cup 62 from the casing end causes the stick to be articulated and to the break apart.

Refer now to FIGS. 14 and 15. A shirred casing stick 23 with a plug closure 92 made according to this invention was placed in an automatic stuffing-linking machine 95 previously described. The stuffing horn 96 was advanced into the bore 89 to abut plug 92 and deshirred a portion of the fore end of casing 26 and seated the fore end of the stick into a chuck (not shown) without articulating the plug 92. The casing 26 and plug 92 are shown substantially as they appear before the meat emulsion is extruded from horn 96.

Refer now to FIGS. 16 and 17. A shirred casing stick 26 with a plug closure 92 made according to this invention was manually stuffed by means previously described. The casing of the stick was deshirred by the meat emulsion which filled the casing to its proper stuffed diameter 97. The filled casing 97 and distended plug 98 are shown substantially as they appear after manual stuffing.

Refer now to FIGS. 18, 19 and 20. In the embodiment wherein the shirred casing closure of the invention is pervious to a gas and provides a plug for meat emulsion, such a casing stick is readily adapted to packaging in a caddy in a manner designating a direction for stuffing. In a caddy 110 with end wall holes appropriately aligned with the bore 89 and additional holes aligned with spaces 112 intermediate the packed casings, the shirred casing closure 92 of the invention is also adapted to post conditioning of the casing by a process of passing a conditioning gas through holes in the caddy and through the bores and around the periphery of the casing sticks packed in the caddy. The end wall holes aligned with the closure 92 in the casing's bores are shown as holes 114 and the holes aligned with the spaces intermediate the packed casings are shown as holes 116.

Thus the closed end casings of the invention may be economically and uniformly post conditioned by passing humidified air in either direction through the caddy and through and about the shirred casing sticks packed therein. This is clearly illustrated in FIGS. 18, 19 and 20. FIG. 19 shows the casings packed in a caddy 110 with all the casing closures 92 abutting one end wall of the caddy. FIG. 20 shows the passage of conditioning gas in both directions through caddy holes 114 aligned with the casing bores 89 and also through caddy holes 116 aligned with the spaces 112 intermediate the packed casings.

It is to be understood that other modifications and changes to the preferred embodiments of the invention herein shown and described can also be made by a person skilled in the art without departing from the spirit and scope of the invention.

I claim:

1. The method of making a hollow shirred meat casing stick having a closure at one end of the stick's bore which comprises, crimping one end of the casing stick without deshirring any portion of said stick, inturning the crimped casing about itself to form a plug of crimped casing, compacting and anchoring the plug into the stick's bore.

2. The method of making a hollow shirred meat casing stick having a closure at one end of the stick's bore which comprises, restraining one end of the casing stick in a support, crimping one side of the supported end of the casing stick without deshirring any portion of said stick, inturning the crimped casing about itself to form a plug of crimped casing, compacting and anchoring the plug into the stick's bore.

3. The method of making a hollow shirred meat casing stick having a closure at one end of the stick's bore, said closure being pervious to the passage of a gas and maintaining its integrity to block the flow of meat emulsion therethrough during the filling operation which comprises, restraining one end of the casing stick in a support, crimping one side of the supported end of the casing stick without deshirring any portion of said stick, inturning the crimped casing about itself to form a plug of crimped casing, compacting and anchoring the plug into the stick's bore.

4. The method of making a hollow shirred meat casing stick having a closure at one end of the stick's bore, said closure being pervious to the passage of a gas and maintaining its integrity to block the flow of meat emulsion therethrough during the filling operation which comprises, restraining one end of the casing stick in a support, indenting and crimping one side of the supported casing end portion, inturning the crimped casing about a crimping blade to form a plug of casing, compacting and anchoring the plug into the stick's bore, and withdrawing the crimping blade from the plug.

5. The method of making a hollow shirred meat casing stick having a closure at one end of the stick's bore, said closure being pervious to the passage of a gas and maintaining its integrity to block the flow of meat emulsion therethrough during the filling operation which comprises, restraining one end of the casing stick in a cradling cup, disuniting a segment of the restrained end from the parent casing stick, obliquely crimping the casing segment about a crimping blade, obliquely inturning the crimped casing on the blade into the stick's bore to form a plug of casing, compacting and anchoring the plug into the stick's bore, and withdrawing the crimping blade from the plug of casing.

6. The method of making a hollow shirred meat casing stick having a closure at one end of the stick's bore, said closure being pervious to the passage of a gas and maintaining its integrity to block the flow of meat emulsion therethrough during the filling operation which comprises, restraining one end of the casing stick in a cradling cup, axially compressing the casing stick into the cup, disuniting a segment of the restrained end from the parent casing stick, obliquely crimping one side of the casing segment about a crimping blade, obliquely collapsing and inturning the crimped casing on the blade into the stick's bore to form a plug of casing, compacting and anchoring the plug centrally into the stick's bore, and withdrawing the crimping blade from the plug of casing to form a gas passage.

7. The method of making a hollow shirred meat casing stick having a closure at one end of the stick's bore, said closure being pervious to the passage of a gas and maintaining its integrity to block the flow of meat emulsion therethrough during the filling operation which comprises, supporting a major portion of the casing stick on a mandrel at one end, restraining the casing stick's other end in an annular cradling cup, compressing the casing stick into the cup, indenting one side of a segment of the cradled casing end, obliquely crimping the indented casing segment about the tip of an obliquely advanced crimping blade, obliquely inturning the crimped casing on the blade, concurrently obliquely advancing and rotating the blade tip into the stick's bore to form the casing into a plug, compacting by implanting and anchoring the plug into the stick's bore, and withdrawing the blade tip from the plug to leave the plug anchored in the bore.

8. The method of making a hollow shirred meat casing stick having a closure at one end of the stick's bore, said closure being pervious to the passage of a gas and maintaining its integrity to block the flow of meat emulsion therethrough during the filling operation which comprises, supporting a major portion of the casing stick on a mandrel at one end, restraining a portion of the casing stick in an annular cradling cup at its other end, axially compressing the casing stick into the cup, indenting one side of a segment of the cradled casing end, obliquely crimping the indented casing segment about the tip of an obliquely advanced crimping blade, obliquely inturning the crimped casing on the blade, concurrently obliquely advancing and rotating the blade tip into the stick's bore to form the casing into a plug, compacting by implanting and anchoring the plug centrally into the stick's bore, and withdrawing the blade tip from the plug to leave the plug anchored in the bore and to provide a gas passage through the closure.

9. The method of making a hollow shirred meat casing stick having a closure at one end of the stick's bore, said closure being pervious to the passage of a gas and maintaining its integrity to block the flow of meat emulsion therethrough during the filling operation which comprises, supporting a major portion of the casing stick on a mandrel at one end, restraining the casing stick's other end in an annular cradling cup, compressing the casing stick into the cup, indenting one side of a segment of the cradled casing end, obliquely crimping the indented casing segment about the tip and shoulder of an obliquely advanced crimping blade, obliquely inturning the crimped casing on a shoulder of the crimping blade by concurrently advancing and rotating the shoulder into the stick's bore to form the casing into a plug having a bilateral passage connecting with a central passage provided when the blade is withdrawn, compacting by implanting and anchoring the plug into the stick's bore, and withdrawing the blade tip from the plug to leave the plug anchored in the bore.

10. The method of making a hollow shirred meat casing stick having a closure at one end of the stick's bore which comprises, supporting a major portion of the casing stick on a mandrel at one end, restraining a portion of the casing stick in an annular cradling cup at its other end, axially compressing the casing stick into the cup, indenting one side of a segment of the cradled casing end, obliquely crimping the indented casing segment about the tip and shoulder of an obliquely advanced crimping blade, obliquely inturning the crimped casing on a shoulder of the crimping blade by concurrently advancing and rotating the shoulder into the stick's bore to form the casing into a plug having a bilateral passage connecting with a central passage provided when the blade is withdrawn, compacting by implanting and anchoring the plug centrally into the stick's bore, and withdrawing the blade tip from the plug to leave the plug anchored in the bore and to provide a gas passage through the closure.

References Cited

UNITED STATES PATENTS

| | | | |
|---|---|---|---|
| 3,162,893 | 12/1964 | Townsend | 17—34 |
| 3,274,005 | 9/1966 | Alsys | 17—49X |
| 3,383,222 | 5/1968 | Alsys et al. | 17—34X |

LUCIE H. LAUDENSLAGER, Primary Examiner